(12) United States Patent
Carman et al.

(10) Patent No.: US 10,706,037 B2
(45) Date of Patent: *Jul. 7, 2020

(54) NON-BLOCKING PROCESSING OF FEDERATED TRANSACTIONS FOR DISTRIBUTED DATA PARTITIONS

(71) Applicant: Amazon Technologies, Inc., Seattle, WA (US)

(72) Inventors: Charles Alexander Carman, Seattle, WA (US); Claire Elizabeth Suver, Seattle, WA (US); Melissa Elaine Davis, Edmonds, VA (US); Paul Matthew Buddington, Charlottesville, VA (US); Christopher Allen Suver, Seattle, WA (US); Lukasz Wojciech Cwik, Seattle, WA (US); Chelsea Celest Krueger, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

This patent is subject to a terminal disclaimer.

(21) Appl. No.: 15/965,567

(22) Filed: Apr. 27, 2018

(65) Prior Publication Data

US 2018/0246923 A1 Aug. 30, 2018

Related U.S. Application Data

(63) Continuation of application No. 14/500,756, filed on Sep. 29, 2014, now Pat. No. 9,959,308.

(51) Int. Cl.
G06F 16/23 (2019.01)
G06F 9/46 (2006.01)

(52) U.S. Cl.
CPC .......... *G06F 16/2343* (2019.01); *G06F 9/466* (2013.01); *G06F 16/2365* (2019.01)

(58) Field of Classification Search
CPC ... G06F 16/2343; G06F 16/2365; G06F 9/466
USPC .......................................................... 707/703
See application file for complete search history.

(56) References Cited

U.S. PATENT DOCUMENTS

| 5,193,188 | A  | 3/1993 | Franaszek et al. |
| 6,216,126 | B1 | 4/2001 | Ronstrom |
| 6,560,601 | B1 | 5/2003 | Bjornerstedt |
| 6,711,573 | B2 | 3/2004 | Ullmann et al. |
| 6,990,503 | B1 | 1/2006 | Luo et al. |
| 7,089,244 | B2 | 8/2006 | Shi et al. |

(Continued)

*Primary Examiner* — Alicia M Willoughby
*Assistant Examiner* — Arthur Ganger
(74) *Attorney, Agent, or Firm* — Robert C. Kowert; Kowert, Hood, Munyon, Rankin & Goetzel, P.C.

(57) ABSTRACT

Non-blocking processing of federated transactions may be implemented for distributed data partitions. A transaction may be received that specifies keys at data nodes to lock in order to perform the transaction. Lock requests are generated and sent to the data nodes which identify sibling keys to be locked at other data nodes for the transaction. In response to receiving the lock requests, data nodes may send to lock queues indicating other lock requests for the keys at the data node. An evaluation of the lock queues based, at least in part, on an ordering of the lock requests in the lock queues may be performed to identify a particular transaction to commit. Once identified, a request to commit the identified transaction may be sent to the particular data nodes indicated by the sibling keys in a lock request for the identified transaction.

20 Claims, 10 Drawing Sheets

(56) References Cited

U.S. PATENT DOCUMENTS

| | | | |
|---|---|---|---|
| 8,055,711 | B2 | 11/2011 | Fachan et al. |
| 8,504,521 | B2 | 8/2013 | Okamoto |
| 8,965,861 | B1 | 2/2015 | Shalla et al. |
| 9,959,308 | B1 | 5/2018 | Carman et al. |
| 2002/0138483 | A1 | 9/2002 | Bretl et al. |
| 2009/0106323 | A1 | 4/2009 | Wong et al. |
| 2013/0297580 | A1 | 11/2013 | Markus et al. |
| 2013/0325827 | A1 | 12/2013 | Markus et al. |
| 2014/0040738 | A1 | 2/2014 | Takimoto |
| 2014/0181342 | A1 | 6/2014 | Antonopoulos et al. |

*lock queues 700*

| Manager | Data Node | Manager's View After Round 1 |
|---|---|---|
| M1 for L1 | Node A | (L1$_0$) |
|  | Node B | (L1$_0$) |
| M2 for L2 | Node A | (L1$_0$) < L2$_0$ |
|  | Node B | (L1$_0$) < L2$_0$ |
| M3 for L3 | Node A | (L1$_0$) < L2$_0$ < L3$_0$ |
|  | Node B | (L1$_0$) < L2$_0$ < L3$_0$ |

FIG. 7

*lock queues 800*

| Manager | Data Node | Manager's View After Round 1 | Manager's View After Round 2 |
|---|---|---|---|
| M1 for L1 | NA | $L1_0$ | $(L1_0) < L2_0 < L3_0 < L2_1 < L3_1 < L1_1$ |
| | NB | $L2_0 < L3_0 < L1_0$ | $L2_0 < L3_0 < (L1_0)(L1_1)$ |
| M2 for L2 | NA | $L1_0 < L2_0$ | $(L1_0) < L2_0 < L3_0 < L2_1$ |
| | NB | $L2_0$ | $L2_0 < L3_0 < (L1_0)(L1_1) < L2_1$ |
| M3 for L3 | NA | $L1_0 < L2_0 < L3_0$ | $(L1_0) < L2_0 < L3_0 < L2_1 < L3_1$ |
| | NB | $L2_0 < L3_0$ | $L2_0 < L3_0 < (L1_0)(L1_1) < L2_1 < L3_1$ |

FIG. 8 lock queues 900

| Manager | Data Node | Manager's View After Round 1 | Manager's View After Round 2 | Manager's View After Round 3 |
|---|---|---|---|---|
| M1 for L1 | Node A | $L1_0$ | $L1_0 < L1_1$ | $L1_0 < L1_1 < L3_2 < L1_2$ |
|  | Node B | $L1_0$ | $L1_0 < L2_0 < L1_1$ | $L1_0 < L2_0 < L1_1 < L2_1 < L3_1 < L1_2$ |
|  | Node C | $L2_0 < L1_0$ | $L2_0 < L1_0 < L1_1$ | $L2_0 < L1_0 < L1_1 < L2_1 < L3_1 < L1_2$ |
|  | Node D |  | $L2_0 < L3_0 < L1_1$ | $L2_0 < L3_0 < L1_1 < L2_1 < L3_1 < L1_2$ |
|  | Node E |  | $L3_0 < L2_0 < L1_1$ | $L3_0 < L2_0 < L1_1 < L2_1 < L3_1 < L1_2$ |
|  | Node F |  |  | $L3_0 < L2_1 < L3_1 < L1_2$ |
| M2 for L2 | Node A |  | $L1_0 < L1_1 < L2_1$ | $L1_0 < L1_1 < L2_2$ |
|  | Node B | $L1_0 < L2_0$ | $L1_0 < L2_0 < L1_1 < L2_1$ | $L1_0 < L2_0 < L1_1 < L2_1 < L3_1 < L1_2 < L2_2$ |
|  | Node C | $L2_0$ | $L2_0 < L1_0 < L1_1 < L2_1$ | $L2_0 < L1_0 < L1_1 < L2_1 < L3_1 < L1_2 < L2_2$ |
|  | Node D | $L2_0$ | $L2_0 < L3_0 < L1_1 < L2_1$ | $L2_0 < L3_0 < L1_1 < L2_1 < L3_1 < L1_2 < L2_2$ |
|  | Node E | $L3_0 < L2_0$ |  | $L3_0 < L2_0 < L1_1 < L2_1 < L3_1 < L1_2 < L2_2$ |
|  | Node F |  | $L3_0 < L2_1$ | $L3_0 < L2_1 < L1_2 < L2_2$ |
| M3 for L3 | Node A |  | $L1_0 < L1_1 < L2_1 < L3_1$ | $L1_0 < L1_1 < L3_2$ |
|  | Node B |  | $L1_0 < L2_0 < L1_1 < L2_1 < L3_1$ | $L1_0 < L2_0 < L1_1 < L2_1 < L3_1 < L1_2 < L2_2 < L3_2$ |
|  | Node C |  | $L2_0 < L1_0 < L1_1 < L2_1 < L3_1$ | $L2_0 < L1_0 < L1_1 < L2_1 < L3_1 < L1_2 < L2_2 < L3_2$ |
|  | Node D | $L2_0 < L3_0$ | $L2_0 < L3_0 < L1_1 < L2_1 < L3_1$ | $L2_0 < L3_0 < L1_1 < L2_1 < L3_1 < L1_2 < L2_2 < L3_2$ |
|  | Node E | $L3_0$ | $L3_0 < L2_0 < L1_1 < L2_1 < L3_1$ | $L3_0 < L2_0 < L1_1 < L2_1 < L3_1 < L1_2 < L2_2 < L3_2$ |
|  | Node F |  | $L3_0 < L2_1 < L3_1$ | $L3_0 < L2_1 < L1_2 < L2_2 < L3_2$ |

FIG. 9

NON-BLOCKING PROCESSING OF FEDERATED TRANSACTIONS FOR DISTRIBUTED DATA PARTITIONS

This application is a continuation of U.S. patent application Ser. No. 14/500,756, filed Sep. 29, 2014, now U.S. Pat. No. 9,959,308, which is hereby incorporated by reference herein in its entirety.

BACKGROUND

Distributed applications, by nature of being distributed, may divide up tasks, problems, or operations among different distributed components of a distributed system. Such distribution offers several advantages. Complex or computing resource intensive tasks may be divided up among multiple low-end computing systems, instead of relying upon a more expensive, monolithic system. The number of computing systems that make up a distributed system for a distributed application may be more easily scaled up or down to reflect changing needs for distributed applications. Distributed systems may also be beneficial when the nature of the tasks performed by an operation, such as where data is generated in one location, and process, stored, or analyzed in another, are physically distributed.

The advantages afforded by distributed applications have led to increasingly large sets of data. These large data sets may be more easily maintained in distributed fashion. Different portions of data may be maintained independently in different locations. However, consistency problems may be introduced when transactions or other operations that update or modify the different portions of data may need to be performed consistently. For instance, if two different transactions modify a portion of data in one location (along with portions of data in other locations), some kind of consistency mechanism may have to be implemented in order to ensure that only one of the transactions modifies the portion of data an completes successfully.

BRIEF DESCRIPTION OF THE DRAWINGS

FIG. 7 is a logical diagram illustrating an example set of lock queues for evaluation to identify a transaction to commit, according to some embodiments.

FIG. 8 is a logical diagram illustrating an example set of lock queues for evaluation to identify a transaction to commit, according to some embodiments.

FIG. 9 is a logical diagram illustrating an example set of lock queues for evaluation to identify a transaction to commit, according to some embodiments.

Figure 1:
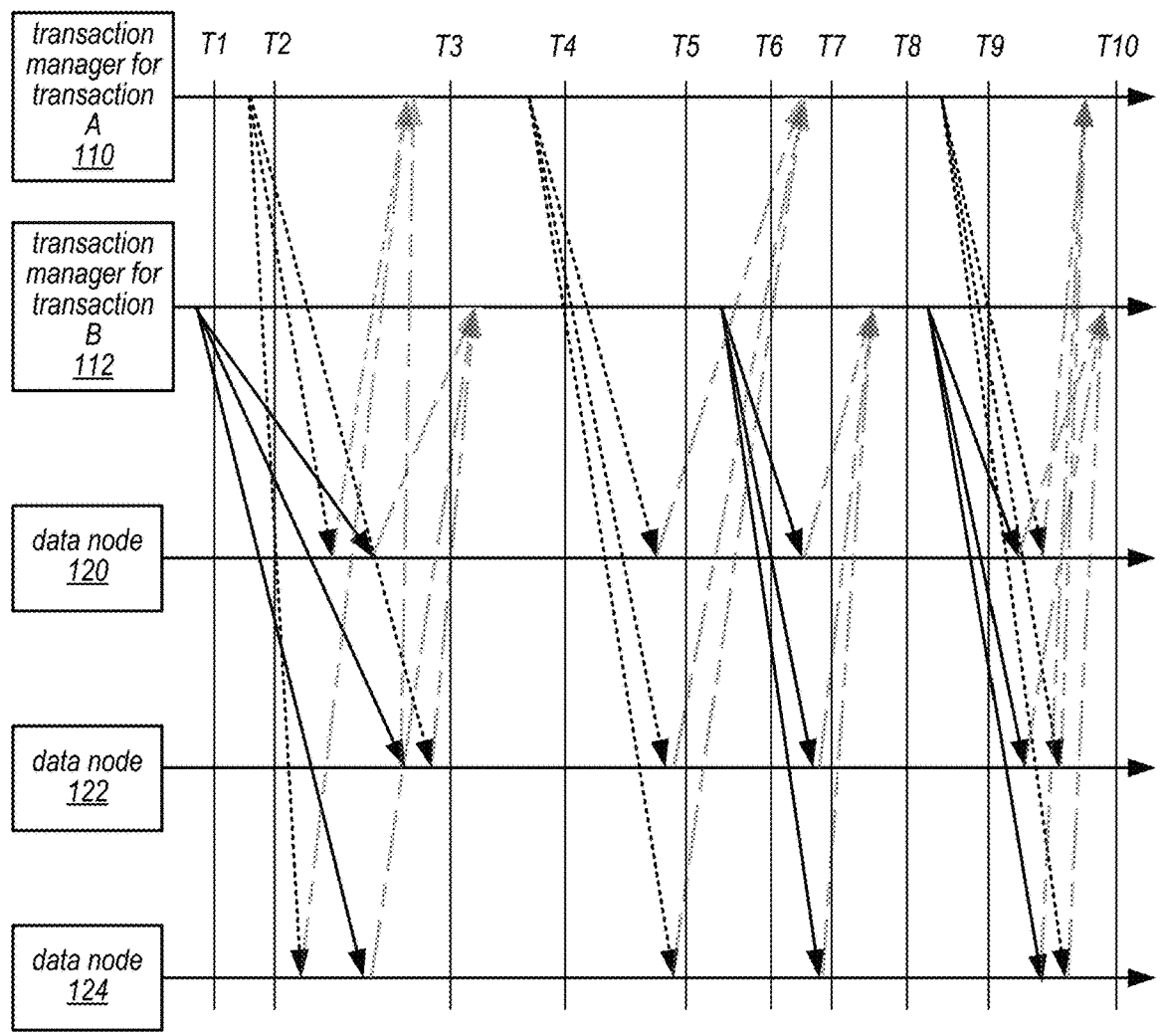
FIG. 1 is a timing diagram and accompanying chart for providing non-blocking processing of federated transactions for distributed data partitions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Systems and methods described herein may be employed in different combinations and in various embodiments to implement provide non-blocking processing of federated transactions for distributed data partitions. Different sets of data or partitions may be stored in multiple different locations. For example, multiple different systems may store data for different components of a service, such as billing information, inventory information, and sales metrics. Updates, changes, or other access to the different sets of data may be performed as part of different transactions. Transactions may conflict or contend when attempting to access the same set of data at a particular partition. Coordination between contending transactions may be performed in order to provide a consistent view of data among the different partitions.

Consider a scenario where a purchase request is received. Updates may need to be made simultaneously among different data partitions in order to ensure that the purchase is completed successfully. A transaction may be defined to include updating billing information (to perform a transfer of purchase funds), updating stock listings for a purchased product in inventory information, and reporting sale information of the purchase to sales metrics. If a second purchase request is received for a same product, then updates may be made to the same inventory information and sale information as in the previous transaction. If the two transactions are performed at the same time, then contention may occur with respect to the inventory information and sale information access as part of both transactions.

Typically, a global transaction manager may be implemented to handle coordination between contending transactions. For instance, a coordinator may identify which transaction to process, and which transaction (if necessary) to fail. A global lock table may, for instance, be managed by a global transaction manager to determine when locks for the requisite data partitions are acquired for performing a particular transaction. A lock may be an exclusive right or use of at least a portion of data maintained in a data partition. In such systems, the processing of one transaction (e.g., the second transaction) may be blocked until it is determined whether or not the selected transaction may succeed or fail, as the acquisition of locks for data partitions may block the progress of other transactions that may also require access to the same lock in order to perform. A two-phase commit technique, for example, may recursively establish locks for different data partitions until either acquiring all of the necessary locks for different data partitions until either or failing to acquire all of the locks. Meanwhile, other transactions that also access one or more of the same portions of data excluded by one or more of the acquired locks may wait until the fate of the current lock-holding transaction is determined.

In various embodiments, non-blocking processing may be implemented, in some embodiments, to process federated transactions for distributed data partitions. In this way, multiple contending transactions may continue processing until a determination can be made that identifies which transaction may be committed. FIG. 1 is a timing diagram and accompanying chart for providing non-blocking processing of federated transactions for distributed data partitions, according to some embodiments. Multiple different transaction managers, such as transaction manager 110 and 120, may be implemented to process transactions among different data nodes maintaining partitions of data, such as data nodes 120, 122 and 124. In FIG. 1, transaction manager 110 may receive transaction A for processing among data nodes 120, 122, and 124, and transaction manager 112 may receive transaction B for processing among data nodes 120, 122, and 124.

At time T0, transaction manager 112 may begin processing transaction B, send lock requests to data nodes 120, 122, and 124. In at least some embodiments, transactions may be fully specified to identify the particular data partitions which may be accessed to perform the respective transaction, allowing one or more multiple transaction managers to determine whether a transaction is still resolving, unable to complete, or can be committed. For example, a transaction may identify which keys or portions of data at a data partition are locked to perform the transaction at different data nodes. Lock requests may be sent to the data nodes for a transaction that identify the sibling keys (keys other than the key hosted at the particular data node sent the lock request) which are to be obtained in order to perform the transaction.

In the case of transaction A in FIG. 1, keys for data nodes 120, 122 and 124 may be specified as part of performing the transaction. Thus, lock requests sent to data nodes 120, 122, and 124 may indicate that for transaction A, keys at the other data nodes are also to be acquired. Transaction B in FIG. 1 may also be specified to obtain keys on data nodes 120, 122 and 124 to perform the transaction, which may be the same keys as specified for transaction A. Transaction manager 112 may begin processing for transaction B, sending lock requests to data nodes 120, 122, and 124, which also indicate the sibling keys for transaction B, keys at the other data nodes that are also to be acquired.

In at least some embodiments, data nodes 120, 122, and 124 may maintain lock request queues, which may include the currently received requests for a key. As data nodes may maintain multiple keys for different portions of a data partition (e.g., a key for an object, row, column, field, etc . . . ), multiple lock request queues may be maintained. When a lock request is received at a data node, a response may be sent to the transaction manager (as illustrated by the gray response arrows) including the lock request queue—which may include all lock requests for the current version of the key up until the received lock request. Thus, lock request queues may be sent in response to the lock requests received at data nodes 120, 122, and 124 to transaction managers 110 and 112. Please note, that the contents of the lock request queues may differ as subsequent lock requests may not be included in earlier responses. For example, As the request from transaction manager 110 to data node 124 arrived in time period T2 prior to the lock request from transaction manager 112, then the lock request queue sent in response to transaction manager 110 may not include the lock request sent by transaction manager 112 for transaction B.

Figure 6:
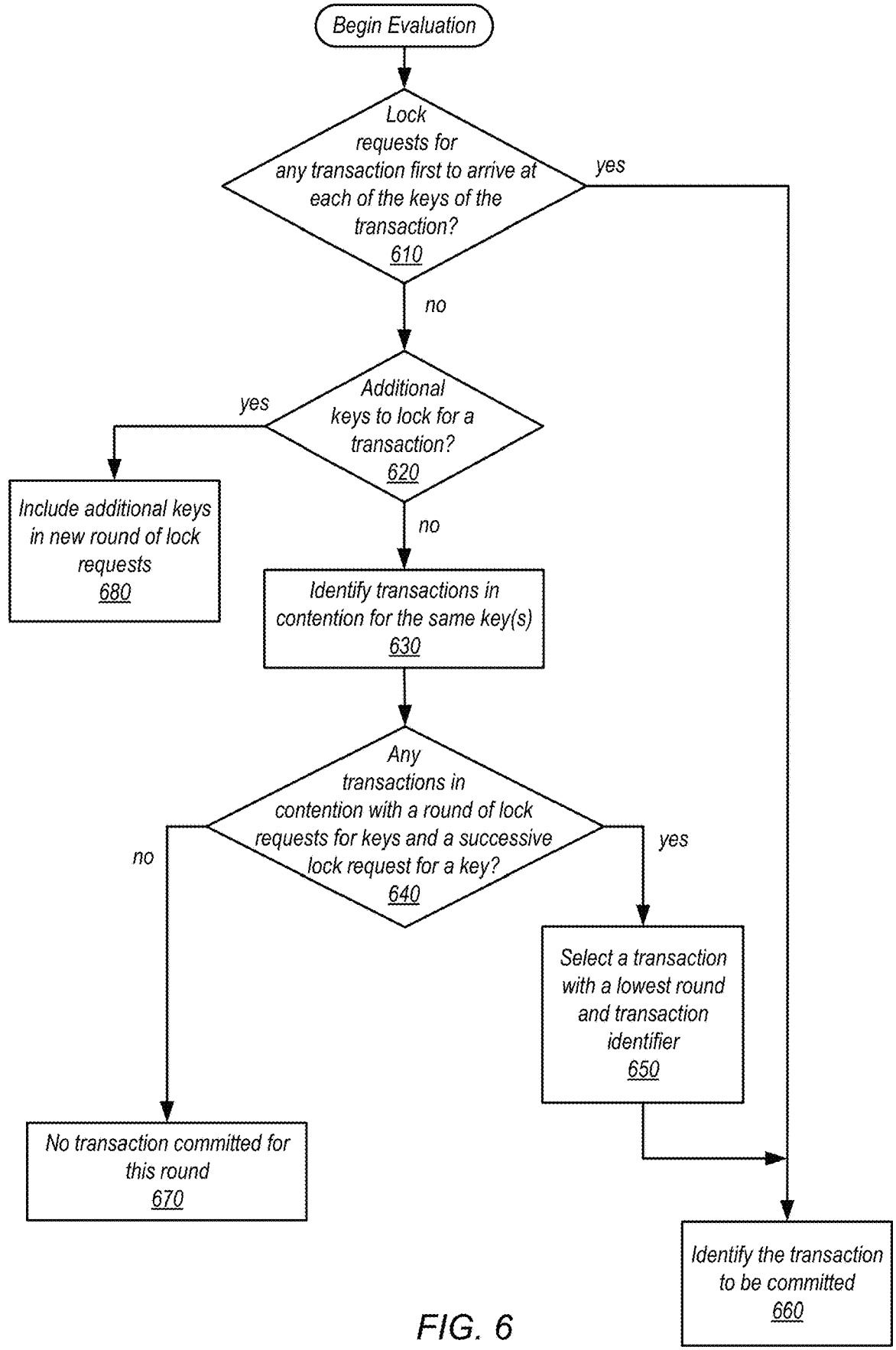
FIG. 6 is a high-level flowchart illustrating various methods and techniques for evaluating lock queues to identify a particular transaction to commit as part of non-blocking processing of federated transactions for distributed partitions of data, according to some embodiments.

Transactions managers may evaluate the lock request queues to determine whether a particular transaction may be identified for commitment, in various embodiments. For example, the transaction managers may apply a set of selection rules which may be applied at any transaction manager to identify the same transaction to be committed. In at least some embodiments, the evaluation may be determined based, at least in part, on an ordering of lock requests in the lock request queues received from data nodes. FIG. 6, discussed below, provides various examples of different evaluation and selection techniques for committing transactions, in some embodiments. If no transaction satisfies the selection rules, then another round of lock requests may be sent to data nodes. For example, as indicated in FIG. 1, the lock queues indicate to transaction manager 110 that transaction A is the first request in the queues for the keys at nodes 120 and 124, while transaction B is the first request in the queue for the key at node 122. Thus, transaction manager 110 may evaluate the queues to determine that neither transaction A nor B can be currently selected to commit. Thus, as illustrated at time period T3, a new round of lock requests may be sent to nodes 120, 122, and 124. Similarly, transaction manager 112 may evaluate responses including lock request queues that indicate transaction B is first in the lock request queue for data node 122, while transaction A is first in the request queue at nodes 120 and 124. As the same selection rules may be applied to evaluate the lock request queues, transaction manager 112 may initiate another round of lock request messages to nodes 120, 122, and 124.

Transaction managers continue to process their transactions until enough metadata in the lock request queues is acquired for transaction managers to make the same selection as to which transaction should commit. Transaction managers that encounter concurrent transactions, including keys that are unseen, may expand the set of keys required to commit a transaction in order to resolve conflicts, as discussed below with regard to FIGS. 6 and 9. As illustrated in FIG. 1, responses from the second round of lock requests received at transaction managers 110 and 112 may be evaluated to identify a same transaction according to the selection rules. In this case, the selection rules may specify that the lowest transaction with successive round locks for all keys may be selected to be committed. Thus, transaction A which is lowest (where A<B) and has successive rounds of locks on the keys at nodes 120, 122, and 124 may be identified to be committed.

Both transaction manager 110 and 112 may send requests to data nodes 120, 122, and 124 to commit transaction A. In this way transaction A may ultimately be committed, whether or not a transaction manager 110 fails prior to sending commit requests. In at least some embodiments, as any transaction manager may determine which transaction should be committed, any transaction manager may send commit requests for the identified transaction. In response to receiving commit requests, transaction manager 110 may acknowledge transaction A as durable to the client, whereas transaction manager 112 may indicate to a client that transaction B failed.

This specification begins with a general description of transaction service, which may provide non-blocking processing of federated transactions for distributed data partitions. Then various examples of a transaction service for performing transactions among distributed data partitions are then discussed, including different components/modules, or arrangements of components/module that may be employed as part of implementing transaction service. A number of different methods and techniques to implement non-blocking processing of federated transactions for distributed data partitions are then discussed, some of which are illustrated in accompanying flowcharts.

Finally, a description of an example computing system upon which the various components, modules, systems, devices, and/or nodes may be implemented is provided. Various examples are provided throughout the specification.

Transaction services that implement non-blocking processing for federated transactions for distributed data partitions may provide distributed, highly-available, multi-key, multi-partition, simple operations with selectable levels of ACID. The various components to provide non-blocking processing may be independently and/or arbitrarily partitioned. In various embodiments, non-blocking processing for federated data transactions may be implemented as a centrally hosted, multi-tenant transactional database of large scale with multiple backend storage technologies. Client applications of the database can share data with other client applications and store data in different long-term stores with different costing models. Moreover, such embodiments may not force clients to choose between availability on the one hand and operating on multiple entities on the other. Additionally these embodiments may allow the integration of heterogeneous backend storage technologies so that clients can choose among a variety of costs and capabilities.

Figure 2:
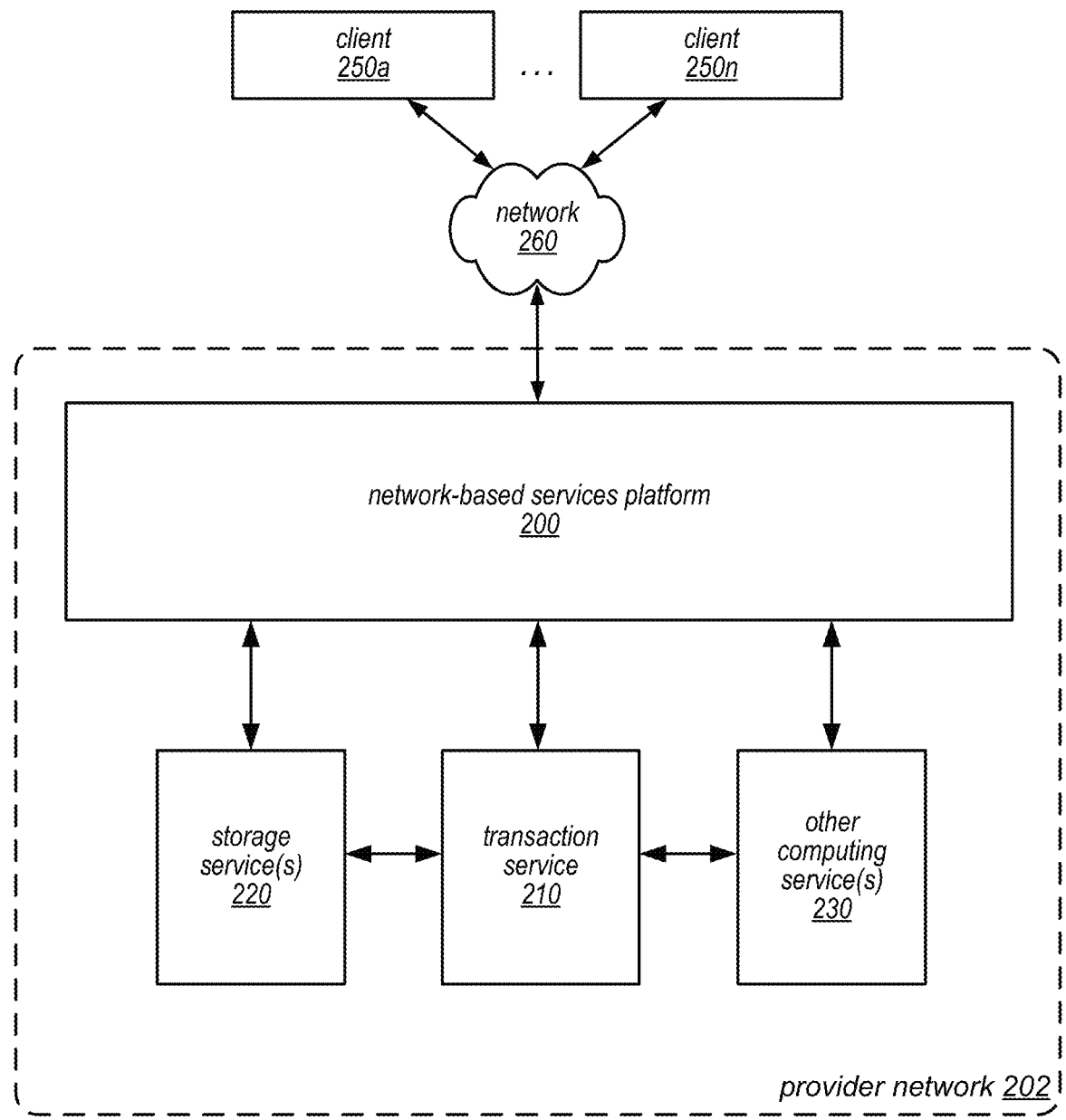
FIG. 2 is a block diagram illustration of a provider network implementing a network-based services platform that includes a transaction service configured to provide non-blocking processing of federated transactions for distributed data partitions, according to some embodiments.

FIG. 2 is a block diagram illustration of a provider network implementing a network-based services platform that includes a transaction service configured to provide non-blocking processing of federated transactions for distributed data partitions, according to some embodiments. A transaction service 210 may implement non-blocking processing for federated transactions for distributed data partitions, as discussed above in FIG. 1. In at least some embodiments, transaction service 210 may be implemented as part of a provider network 202, which may include network-based services platform 200, and may be configured to communicate with other storage back-ends or services, such as storage service(s) 220, which in some embodiments may also be part of network-based services platform 200 and other virtual computing services 230. Clients 250 may communicate with transaction service 210 directly and/or via network-based service platform 200, which may implement a network-based interface for transaction service 210 in some embodiments. Clients 250 may utilize transaction service 210 to perform various transactions that update different partitions of data stored among storage service(s) 220 and/or other computing service(s) 230.

In various embodiments, a number of clients (shown as clients 250*a*-250*n*) may be configured to interact with a network-based services platform 200 in a provider network via a network 260. Network 260 may be the Internet, a wide area network, a local area network, or any other network or combinations thereof. A provider network, such as provider network 202, may include numerous data centers (which may be distributed across different geographical regions) hosting various resource pools, such as collections of physical and/or virtualized computer servers, storage devices, networking equipment and the like, needed to implement, configure and distribute the infrastructure and services offered by the provider. Network-based services platform 200 may be configured to interface with one or more instances of a transaction service 210, storage service(s) 220, and/or one or more other virtual computing service(s) 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one key value data store component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a computational client) may encompass an application such as a database application (or user interface thereof), a media application, an office application or any other application that may make use transaction service 210 to store and/or access one or more distributed data partitions among storage services 220 or other computing services 230. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture. In some embodiments, clients 250 may be other distributed systems, such as distributed databases that may access transaction service 210 directly, or through network-based services platform 200.

In some embodiments, a client 250 may be configured to provide access to network-based services, such as transaction service 210, storage service(s) 220, and/or other virtual computing service(s) 230 in a manner that is transparent to those applications. For example, client 250 may be configured to interact with 3 different data stores implemented as part of storage service(s) 220. This client may submit transactions that modify data on the 3 different data stores to transaction service 210. Other clients 250 may also submit transactions modifying data on one or more data stores overlapping with at least one of the 3 different data stores. Transaction service 210 may provide one or more transaction managers, such as transaction manager 310 described below in FIG. 3, to process the contending transactions. Applications may not need to be modified to make use of the service model of FIG. 2. Instead, the details of interfacing to network-based services platform 200 may be coordinated by client 250 and the operating system or file system on behalf of applications executing within the operating system environment at a client 250.

Clients 250 may convey network-based services requests (e.g., transactions) to and receive responses from network-based services platform 200 via network 260. In various embodiments, network 260 may encompass any suitable combination of networking hardware and protocols necessary to establish network-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a data service system (e.g., a system that implements replication coordination service 210 and/or data storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements transaction service 210, storage service(s) 220 and/or another virtual computing service(s) 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data (such as database tables or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity.

In certain embodiments, platform 200 may be configured to collect, monitor and/or aggregate a variety of operational metrics for services 210, 220 and/or 230, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data or records thereof (e.g., size, data type, etc.), or any other suitable metrics. In at least some embodiments, metadata collected from lock requests and lock request queues maintained at data nodes may provide per client and per query run-time analytics, such as collecting the number of keys acquired or attempted to be acquired per partition of data. Thus, comprehensive data regarding contention, query, and data structure may allow transaction service 210 or network-based platform 200 to provide automated analysis for optimization and application troubleshooting to clients. For example, in some embodiments such metrics may be used by system administrators to tune and maintain system components, while in other embodiments such metrics (or relevant portions of such metrics) may be exposed to clients 250 to enable such clients to monitor their usage of transaction service 210, storage service(s) 220 and/or another virtual computing service(s) 230 (or the underlying systems that implement those services).

In some embodiments, network-based services platform 200 may also implement user authentication and access control procedures. For example, for a given network-based services request to perform a transaction with regard to a particular portion of data, platform 200 may be configured to ascertain whether the client 250 associated with the request is authorized to access the particular portion of data. In some embodiments, one of other virtual computing service(s) 230 may be an authentication and/or access management service that may determine the identity of client 250. Platform 200 may determine such authorization by, for example, evaluating an identity, password or other credential against credentials associated with the particular database, or evaluating the requested access to the particular database against an access control list for the particular data. For example, if a client 250 does not have sufficient credentials to access the particular portion of data, platform 200 may reject the corresponding network-based services request, for example by returning a response to the requesting client 250 indicating an error condition. Various access control policies may be stored as records or lists of access control information by transaction service 210, storage service(s) 220 and/or other virtual computing service(s) 230.

It is noted that while network-based services platform 200 may represent the primary interface through which clients 250 may access the features of transaction service 210, it need not represent the sole interface to such features. For example, an alternate API that may be distinct from a network-based services interface may be used to allow clients internal to the enterprise providing the computing service to bypass network-based services platform 200. Note that in many of the examples described herein, transaction service 210 may be internal to a computing system or an enterprise system that provides computing services to clients 250, and may not be exposed to external clients (e.g., users or client applications). In such embodiments, the internal "client" (e.g., storage service(s) 220) may access transaction service 210 over a local or private network, shown as the solid line between storage service(s) 220 and transaction service 210 (e.g., through an API directly between the systems that implement these services). In such embodiments, the use of transaction service 210 in performing transactions among data stores of storage services 220 and/or other services 230 on behalf of clients 250 in way that may be transparent to those clients. In other embodiments, transaction service 210 may be exposed to clients 250 through network-based services platform 200 (or directly exposed) such that transaction services between clients 250 that are external distributed databases performing federated transactions may be employed.

In various embodiments, storage service(s) 220 may represent may different types of data stores, schemes, engines, or techniques. For example various distributed object caches, non-relational data stores, relational databases, long-term object stores, analytics engines, data warehouses, or archival data stores may be implemented. Similarly, other virtual computing service(s) 230 may represent many different types of services that maintain a partition of data which may be accessed as part of a transaction, such as different types of data pipeline services or workflow engines.

In various embodiments, transaction service 210 may provide transaction managers and/or data nodes for performing non-blocking processing of federated transactions for distributed data partitions. For example, transactions may be submitted to transaction service 210 which may provision a transaction manager for processing the transaction. Data nodes may be provisioned acting as front-ends for underlying storage systems, such as storage services 220, other computing service(s) 230, or storage systems external to provider network 202 (e.g., on-premise or local storage systems maintaining a partition of data).

Transaction service 210 may be implemented to provide various different kinds of characteristics for handling transactions. For example, transaction support may be provided for mutations spanning partition boundaries. Transaction support may address multiple subcomponents for one or more database entities including indices, views, and referential integrity. Data sharing between applications via views with may be provided with user specified consistency. Schema support for documents, nested objects (or parent-child tables), defined as a hierarchy with a single parent with a partition key may be provided. Multiple backend integration options for online analytics processing and automated archiving may be supported. Global replication support with user specified mastering constraints may be implemented. Online analysis of storage run-time performance with automated optimizations may be implemented. Moreover, support for data security for data on a network and at rest with a user specified granularity ranging from rows to columns to views and indices may be provided.

Figure 3A:
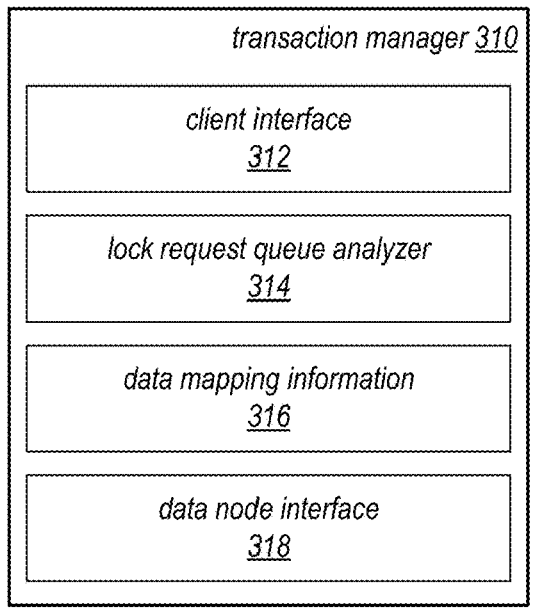
FIG. 3A is a block diagram illustrating a transaction manager that provides non-blocking processing of federated transactions for distributed data partitions, according to some embodiments.
Figure 3B:
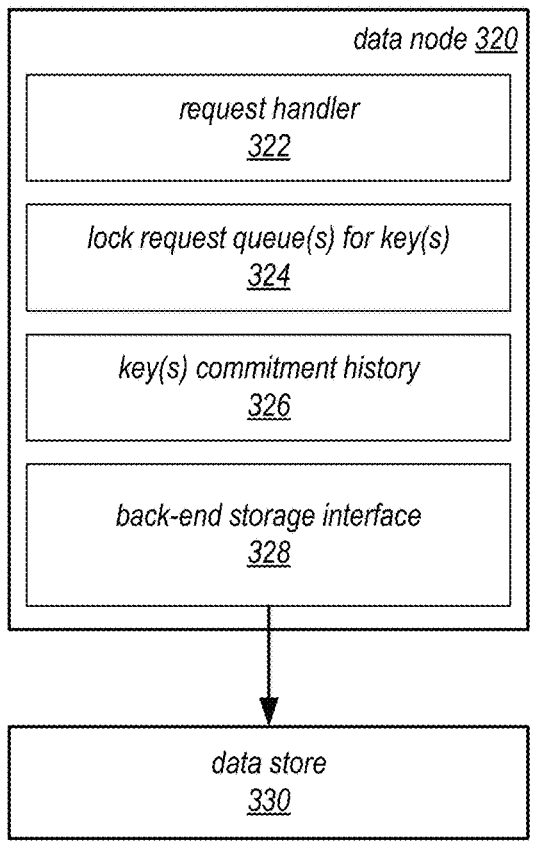
FIG. 3B is a block diagram illustrating a data node for a data partition for which non-blocking processing of federated transactions may be performed, according to some embodiments.

FIGS. 3A and 3B illustrate example transaction managers and data nodes which may be implemented as part of transaction service 210, in various embodiments (or may be implemented as part of other systems, services, or applications different than transaction service 210). As illustrated in FIG. 3A, transaction manager 310 may implement a client interface to handle requests from a client, such as client 250 in FIG. 2 above. Transaction manager 310 may also implement lock request queue analyzer 314 to identify and/or select transactions to be committed according to various techniques, as discussed below with regard to FIGS. 5-9. Transaction manager 310 may also have access to data mapping information 316, in some embodiments, which may allow for the particular data nodes included in the performance of a transaction to be identified, in various embodiments. Transaction manager 310 may also implement data node interface 318, which may be configured to communicate lock requests and receive responses from data nodes (e.g., via a programmatic interface). For example, data node interface may be configure to generate a globally unique transaction identifier for a received transaction to be included with a lock request for a key (e.g., generated by creating a very large random number). Transaction manager 310 may implement the various techniques discussed below with regard to FIGS. 4-9, in various embodiments.

FIG. 3B is a block diagram illustrating a data node for a data partition for which non-blocking processing of federated transactions may be performed, according to some embodiments. Data node 320 may, in various embodiments implement a request handler 322 to receive lock requests for respective keys maintained at data node 320 and send back responses based on the lock request queue(s) for key(s) 324 and key(s) commitment history 326. Lock request queue(s) for key(s) 324 may be maintained, in various embodiments, describing the current lock requests for a particular key at data node 320. In at least some embodiments, the lock request messages themselves may be stored and included in a response back to lock requests. Key(s) commitment history 326 may be implemented, in various embodiments, to identify which transactions have been committed for a key, in various embodiments (e.g., by transaction identifier). Persistent storage devices, such as hard disk drives or solid state drives, may be implemented to maintain lock request queues 324 and commitment history 326. In various embodiments, key(s) commitment history 326 may be adjusted by clients in order to increase or decreased in order to provide greater cost flexibility for maintaining committed versions of the key. Data node 320 may also implement back-end storage interface 328, which may provide an interface to apply committed transactions to data store 330. Data store 330 may be one of various different types of data stores (as discussed above with regard to storage service(s) 220, other computer service(s) 230, or any other type of data store configured to maintain a partition of data that is accessed as part of the transaction. Back-end storage interface 328 may communicate with data store 330 using various protocols or techniques, such as APIs, to apply committed transactions to data store 330. Data node 330 may implement the various techniques discussed below with regard to FIGS. 4-9, in various embodiments.

Figure 4:
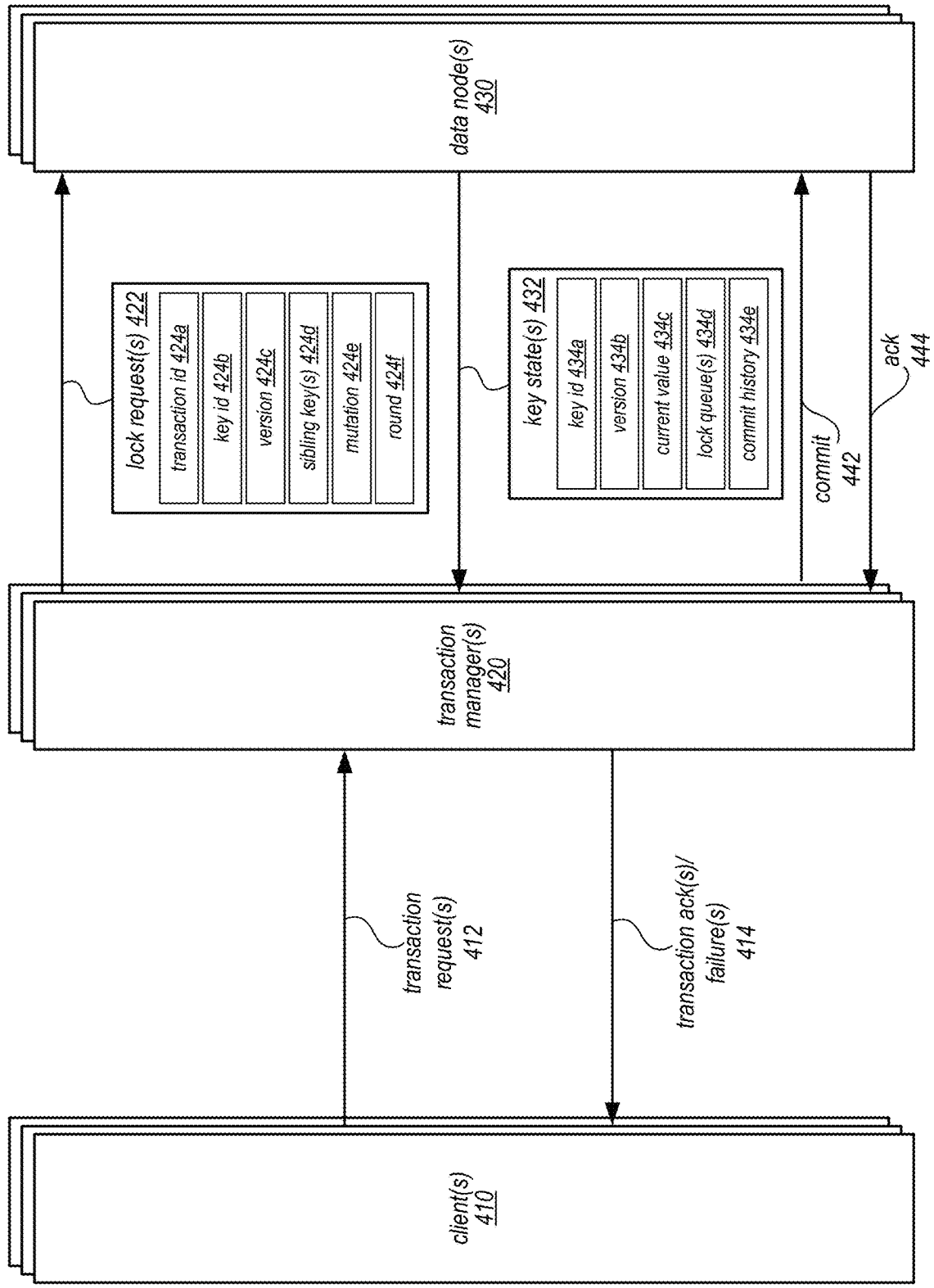
FIG. 4 is a block diagram illustrating interactions among a client, transaction manager and data node as part of providing non-blocking processing of federated transactions for distributed data partitions, according to some embodiments.

FIG. 4 is a block diagram illustrating interactions among a client, transaction manager and data node as part of providing non-blocking processing of federated transactions for distributed data partitions, according to some embodiments. Client(s) 410 may be similar to clients 250 described above in FIG. 2 or any other client which may communicate with transaction managers 420 to perform non-blocking processing of federated transactions for distributed data partitions. As illustrated in FIG. 4, client(s) 410 may submit transaction request(s) 412 to a respective transaction manger 420 to be performed. As noted earlier, transaction requests may fully specify the transaction identifying the data nodes 430 upon which a lock to a key is to be obtained in order to perform the transaction.

Based on the specified keys in the transaction, transaction manager(s) 420 may send lock request(s) 422 to lock the identified keys at data nodes 430, in various embodiments. Lock requests 422 may include a unique transaction identifier 424a, a key identifier 424b, a version 424c for the key (e.g., providing an optimistic lock for the version), sibling keys 424d (indicating the other keys to be locked in addition to the key at the data node sent the lock request in order to perform the transaction, as well as the associated version of the key to be obtained), mutation 424e (which indicates the new data values or modification to be made to the data locked by the key), and a round identifier 424f (which identifies the round of lock requests for the transaction that this lock request is a part of, such as 0, 1, 2, 3, etc . . . ).

As each lock request 422 may send various ones of the metadata 424 described above, data nodes 430 may response with key states 432 to the transaction managers in response to receiving the lock requests 422. Key states 432 may include, in various embodiments, the key identifier 434a, the current version for the key 434b, the current value 434c for the data specified by the key, lock queues 434d (which may include the lock requests 422 received for that key from any transaction manager 420 for any transaction at the time the lock request is received), and commit history 434e (which may indicate which transactions have been committed to update the data specified by the key).

As noted above, after sufficient rounds of lock requests, transaction managers 420 may identify the same transaction to commit. One or more of the transaction managers 420 may send a commit request 442 to data nodes 430 maintaining the keys for to perform transaction to commit the transaction. As transaction managers 420 may be trusted to reach the same decision, data nodes 430 may always comply with a commit request (unless the transaction has already been committed in response to which a confirmation of the transaction identified as committed may be sent back to the transaction manager 420). The commit 442 may include the transaction id to commit. Similarly, acknowledgment 444 may include the transaction identifier of the transaction committed. Transaction managers 420 may then send respective successful acknowledgments 414 to the client 410 with the committed transaction, and failures to the client(s) 410 with the unsuccessful transaction(s). In some embodiments, transaction managers 420 may send acknowledgments of a committed transaction 414 to a client (or failure) without receiving acknowledgments of a commit 444 from the data nodes 430 of the transaction committed.

Figure 5:
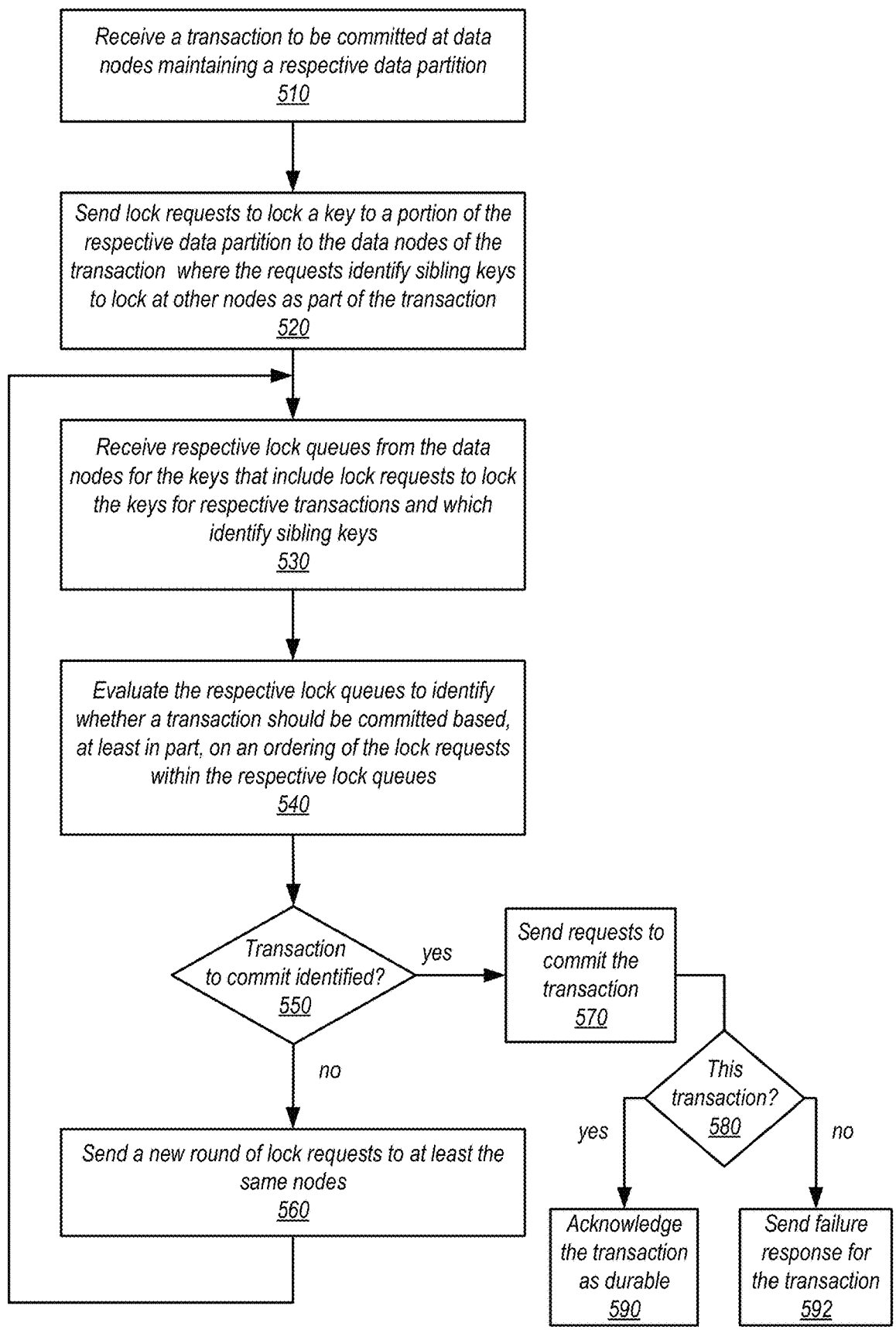
FIG. 5 is a high-level flowchart illustrating various methods and techniques for non-blocking processing of federated transactions for distributed data partitions, according to some embodiments.

The examples of a transaction service providing non-blocking processing for federated transactions for distributed data partitions discussed above with regard to FIGS. 2-4 have been given in regard to a network-based service providing a transaction service, storage service(s), and other computing services that maintain data partitions. However, various other types of systems or services that may be implemented as separate or standalone systems may perform non-blocking processing for federated transactions for distributed data partitions. FIG. 5 is a high-level flowchart illustrating various methods and techniques for non-blocking processing of federated transactions for distributed data partitions, according to some embodiments. These techniques may be implemented in many other ways, such as implementing standalone transaction mangers and data nodes, as part of an application that updates different data stores, and thus the following discussion is not intended to be limiting as to the other types or configurations of systems, components or devices that may implement non-blocking processing of federated transactions for distributed data partitions.

As indicated at 510, a transaction to be committed at particular data nodes maintaining respective data partitions may be received, in various embodiments. The transaction request may identify the various keys (corresponding to a portion of data that may be locked at a partition of data at a data node) with are to be locked in order to perform the transaction. For example, the keys may represent various objects, locations, schemas, or other identifiers of data in a partition to be updated (e.g., daily sales total, number of views, row X, etc . . . ). As multiple keys may be maintained at a single data node, in at least some embodiments, more than one key maintained at a particular data node may be identified as part of the transaction.

As indicated at 520, lock requests may be sent to lock the key to the portion of the respective data partition of the particular data nodes of the transaction. As noted above in FIG. 4, the lock requests may identify sibling keys at other data nodes to lock as part of performing the transaction, in some embodiments. For example, a transaction that locks keys at nodes A, B, and C, will include in a lock request sent to node C, sibling keys for A and B. Other information may also be included in the lock request, such as a round identifier (which may be initialized to 0 for the first round), a key identifier, a version for the key (e.g., providing an optimistic lock for the version), and a mutation for the data specified by the key.

As indicated at 530, respective lock queues from the different data nodes sent the keys may be received, in various embodiments. The lock request queues may include lock requests current (as of the receipt of the request) for the key at the data node (and may include the various other information included in a lock request above or in key state 432 described above with regard to FIG. 4) which also identify sibling keys that are to be locked as part of the transaction identified in the lock request.

As indicated at 540, the respective lock queues may be evaluated to identify whether a transaction included in one of the lock request queues should be committed based, at least in part, on an ordering of the lock requests within the lock request queues, in various embodiments. For example, locks that are "first" to arrive in the queue of each of the indicated locks for a particular transaction may indicate that the transaction should be committed. Various different sets of selection rules may be applied, which may select transactions that would be selected at any transaction manager applying the same set of rules based on the information received in the lock request queues. FIGS. 6-9 provide various examples of different selection scenarios in which the different orderings of lock requests in the lock request queues may be evaluated to identify a transaction to be committed.

If a transaction is identified, as indicated by the positive exit from 550, then requests to commit the transaction may be sent to the data nodes, as indicated at 570. If the transaction committed was the transaction received at this transaction manager, as indicated by the positive exit from 580, then an acknowledgment that the transaction is durable may be sent to the client. If not, as indicated by the negative exit from 580, then a failure response may be sent to the client for the transaction as indicated at 592.

If no transaction is identified based on the evaluation of the respective lock queues, as indicated by the negative exit from 550, then a new round of lock requests is sent to at least the same nodes, as indicated at 560. In some embodiments, a round identifier may be incremented when sending the new requests. As discussed below with regard to FIG. 6, additional lock requests for new keys may be sent to data nodes, expanding the set of keys to be locked in order to perform the transaction in order to resolve contention among transactions. As indicated by the loop back to element 530, new responses from the new round of lock requests may be received and evaluated. The elements of 530, 540, 550, and 560 may be repeated until a transaction to commit is identified, in various embodiments.

Non-blocking processing, as described above in FIG. 5, may allow for many different types of transactions to be performed. In some embodiments, batch insert operations may be performed, mapping inserts to multiple different partitions into a single transaction. For example, a conditional HTTP PUT request with a multi-part URI and a multi-part payload may be implemented as a single transaction involving inserts/update to multiple keys having some number of conditions that are not violated. Similarly, bath update operations may be implemented in some embodiments, that can support distributed calculated values. For example, a vendor_items table may have an insert of a line item performed and a vendor_totals table might be updated atomically in a same transaction.

Other types of transactions may involve transactional queues, in some embodiments. A transaction can create data in specialized queue tables, in order to perform customer transaction processing (as well as other similar domains) to ensure proper and timely handling of all order transactions. Clients can create transactions that both create new data and guarantee eventual notification of this new state with a push model. In some embodiments, transactions may be implemented to provide consistent indexing or views. Transaction managers may recognize index fields and then generate transaction keys that become part of the transaction itself to be performed. Recognizing an index as a specialized view and generalizing this concept allows views to be treated as part of a transaction. For example, if a table customer_profiles presents a preferred_marketplace view, then a transaction manager can accept modifications to the table or the view and create the appropriate keys to include in the transaction. Similarly, referential integrity may be maintained by allowing data set metadata definitions to specify constraints. Transaction managers may read these definitions and create transaction keys to be included in the transaction that guarantee relational conditions including existence.

Non-blocking processing may allow multiple different transaction managers such that global data sets may be managed with regional mastering (instead of global mastering). Clients may be able to specify conditional operations against data sets that may include specifications for replication. For example, a customer_profiles table may be replicated across different data partitions. The table includes an attribute order_processing_region. A client may issue a transaction request that conditionally creates a new order record in customer_orders in a given partition if and only if the customer profile has a matching order processing region. At the same time, the client may optimistically change the attribute across all partitions with a transaction that spans partitions. This enables restricting and optimization transaction may allow processing by region.

FIG. 6 is a high-level flowchart illustrating various methods and techniques for evaluating lock queues to identify a particular transaction to commit as part of non-blocking processing of federated transactions for distributed partitions of data, according to some embodiments. In some embodiments, an evaluation of lock requests may examine whether lock requests are first to arrive at each of the keys of the transaction, as indicated at 610. For example, FIG. 7 is a logical diagram illustrating an example set of lock queues for evaluation to identify a transaction to commit, according to some embodiments. Lock queues 700 illustrates 3 different transactions, L1, L2, and L3, and the respective lock queues received at each of the lock managers that send lock requests to lock a key at data nodes A and B. After the first round of lock requests are sent, each transaction manager may evaluate the lock requests in the queue according to the order of the requests in the queue. Note that the subscript number after the transaction (e.g., $L1_0$) denotes a round number and the <symbol denotes that A<B=A arrived before B. Transaction manager M1 evaluates the lock request queue for Nodes A and B, and only identifies the request for transaction L1. Thus, the lock request for L1 is first to arrive at Nodes A and B for the transaction L1. M1 would, according to element 610, would be identified as the transaction to be committed, as indicated at 660. Similarly, transaction manager M2 for transaction L2 would evaluate the queues for nodes A and B and recognize that the request for L1 arrive first at both nodes A and B. Moreover, based on the sibling key data, M2 would identify that L1 requires no other keys and thus M1 will commit transaction L1. Thus, as the circles denote, M2 will also select L1 to commit as the first to arrive, as indicated at 610. Transaction manager M3 for transaction L3 will follow similar reasoning. Evaluation of the queues for nodes A and B indicates that the request for L1 arrive first at both nodes A and B, and the sibling key data in lock requests for L1 indicates that L1 requires no other keys. Thus, M3 will commit transaction L1.

As indicated at 620, in some embodiments, additional keys to lock for the transaction may be discovered. For example, if two transactions only contend on some keys of data nodes, then each transaction may attempt to obtain the locks to the keys required for the other transaction in order to successfully complete the transaction. If additional keys are identified, then additional keys are included in a new round of lock messages to be sent. FIG. 9 is a logical diagram illustrating an example set of lock queues for evaluation to identify a transaction to commit, according to some embodiments.

As with FIG. 7 above, lock queues 900 illustrates 3 different transactions, L1, L2, and L3, and the respective lock queues received at each of the lock managers that send lock requests to lock a key at data nodes A, B, C, D, E, and F. Transaction L1 only attempts to lock keys at nodes A, B, and C. Transaction L2 only attempts to lock keys at nodes B, C, D, and E. Transaction L3 attempts to lock keys at nodes D, E, and F. After round 1, manager M1 identifies that transaction L2, ahead of L1 at node C, also needs to acquire locks at node D and node E. Thus, in a second round of lock requests, M1 sends lock requests to lock the additional keys at nodes D and E. In response to lock queues for nodes D and E, M1 adds a new key for node F (which allows M1 to attempt to resolve contention among the three known transactions L1, L2, and L3). Similarly, M2 identifies that after round 1 that keys at nodes A and F may need to be added based on the keys for performing transactions L1 and L3. M3 identifies that keys at nodes B and C may need to be added based on the keys for performing transaction L2. Determining new keys to include may occur multiple times. For instance, in FIG. 9, after round 2 M1 discovers that a key to node F may need to be added. Similarly, M3 discovers that a key to node A may need to be added.

In at least some embodiments, an expansion threshold may be enforced with respect to adding new keys. For example, if an expansion threshold is set to 5, then after 5 rounds of adding new keys, a transaction manager may send a lock request indicating that the transaction failed due to exceeding the expansion threshold to the data nodes to be included in the lock requests queues (so that other nodes may not include that transaction in subsequent evaluations), effectively aborting transaction processing of the transaction. A failure response may also be sent to the client.

Returning to FIG. 6, in various embodiments, transactions in contention for the same keys may be identified, as indicated at 530. For example, the lock requests for different transactions in a lock request queue may identify the transactions in contention for the key associated with the lock request queue. The transactions in contention may be evaluated to identify whether any transactions in contention have a round of lock requests at each of the keys for the transaction, and at least one successive lock request for another key, as indicated at 640.

For example, FIG. 8 is a logical diagram illustrating an example set of lock queues for evaluation to identify a transaction to commit, according to some embodiments. As with FIG. 7 above, lock queues 800 illustrates 3 different transactions, L1, L2, and L3, and the respective lock queues received at each of the lock managers that send lock requests to lock a key at data nodes A and B. After round 1, no transaction has achieved first lock request at both data nodes A and B. Thus, the transaction managers M1, M2, and M3 may send out a second round of lock requests. After the second round of lock requests, each transaction manager may identify the lock whether a lock request has all of round "0" locks and at least one round "1" lock. M1 recognizes that L1, L2, and L3 all have round "0" locks and at least one round "1" lock. M2 recognizes that L1 and L2 have round "0" locks and at least one round "1" lock. M3 recognizes that L1, L2, and L3 all have round "0" locks and at least one round "1" lock. Thus transactions L1, L2, and L3, may be identified as indicated by the positive exit from 640. In order to break the tie, a transaction with a lowest round and transaction identifier may be identified, as indicated at 650. In this example, L1 may be considered to have the lowest transaction identifier, and thus may be identified to be committed as indicated at 660. Each transaction manager may, based on the lock request queues 800, reach the same conclusion, illustrated by the circled transactions in after round 2 in FIG. 8.

If not transaction can be identified, as indicated by the negative exit from 640, then no transaction may be committed for this round, as indicated at 670. However, as discussed above in FIG. 5, a new round of lock requests may be sent out, and the resultant lock request queues received in response to those requests may be evaluated, including new information. Thus, multiple rounds may be performed, in some embodiments in order identify a transaction to be committed. FIG. 9, for instance, illustrates that it takes 3 rounds to identify transaction L2 as the transaction to be committed (as the only transaction with a round of lock requests for each key and at least one successive request which are circled).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 10:
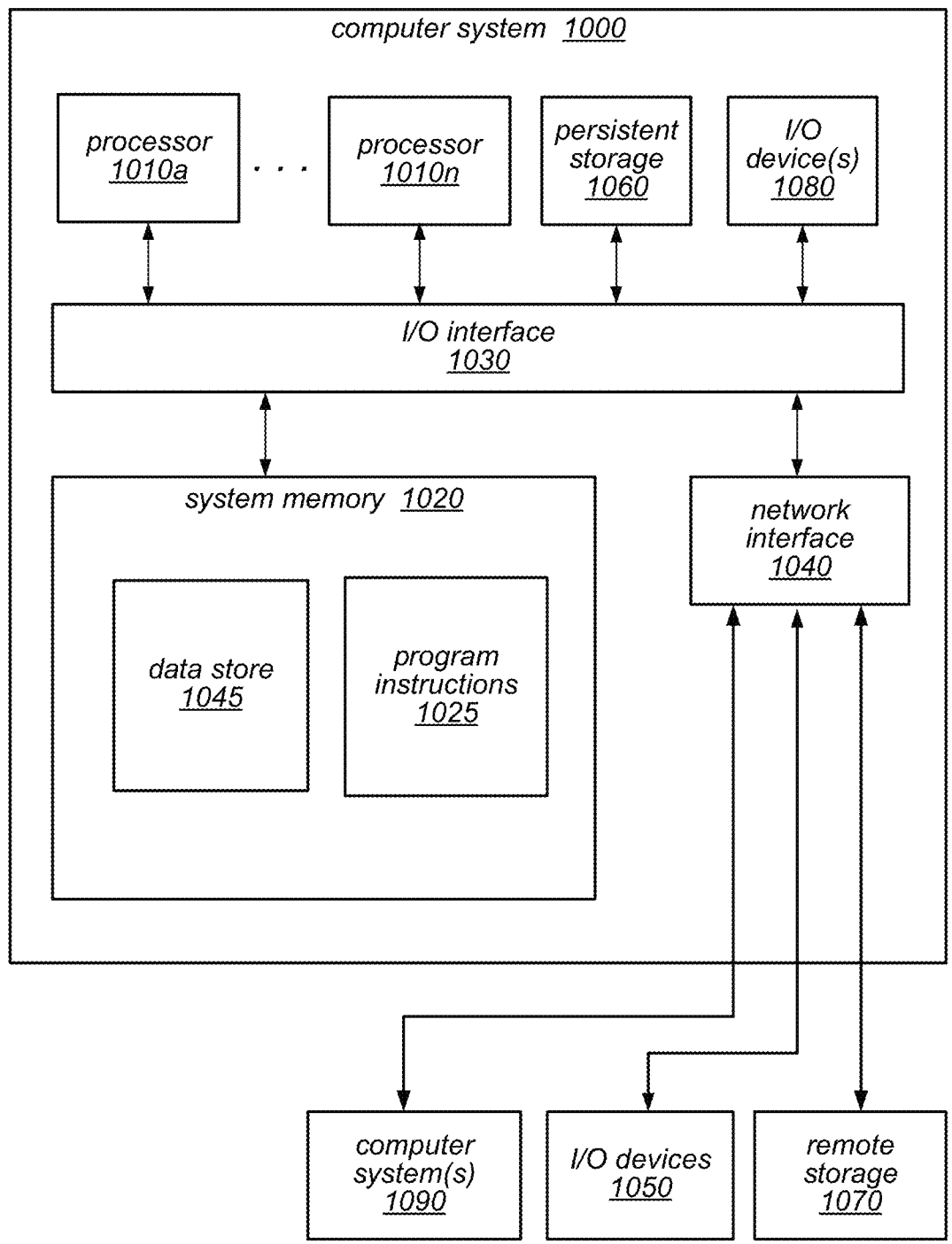
FIG. 10 a block diagram illustrating an example computing system, according to some embodiments.

Embodiments of providing non-blocking processing for federated transactions for distributed data partitions as described herein may be executed on one or more computer systems, which may interact with various other devices. FIG. 10 is a block diagram illustrating an example computer system, according to various embodiments. For example, computer system 1000 may be configured to implement nodes of a compute cluster, a data store, service, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a transaction manager, data node, or a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a storage service, transaction service, other computing service(s), compute or storage node, or various components or nodes of a transaction system, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method, comprising:
    sending to a plurality of data nodes respective lock requests that identify for each respective data node one or more keys to lock at the respective data node and respective sibling keys to lock at data nodes other than the respective data node to perform a first transaction;
    receiving, responsive to the respective lock requests, respective lock queues from the data nodes sent the respective lock requests, wherein at least one of the respective lock queues includes a lock request for another transaction in addition to the first transaction;
    evaluating the respective lock queues from the data nodes to identify a transaction to commit based, at least in part, on an ordering of the one or more lock requests within the respective lock queues; and
    sending a request to commit the identified transaction to the data nodes identified according to sibling keys included in a lock request for the identified transaction.

2. The method of claim 1, wherein sending the respective lock requests, receiving the respective lock queues, evaluating the respective lock queues, and sending the request to commit are performed as part of a current round of transaction processing, wherein sending the respective lock requests, receiving the respective lock queues, and evaluating the respective lock queues are performed for one or more prior rounds of transaction processing, wherein a transaction is not identified to be committed as part of the one or more prior rounds of transaction processing.

3. The method of claim 2, wherein prior to sending the respective lock requests, receiving the respective lock queues, evaluating the respective lock queues, and sending the request to commit as part of a current round of transaction processing, identifying one or more additional keys at one or more other data nodes based, at least in part, on respective lock queues received as part of a prior round of transaction processing, wherein the one or more other data nodes are included with the plurality of data nodes sent the respective lock requests as part of the current round of transaction processing.

4. The method of claim 3, wherein including the one or more other data nodes as part of the current round of transaction processing is performed in response to determining that the one or more additional keys are below a key expansion threshold, wherein another transaction determined to include additional keys in excess of the key expansion threshold aborts transaction processing.

5. The method of claim 1, wherein evaluating the respective lock queues to identify the transaction to commit comprises identifying a particular transaction whose respective lock requests were first to arrive at the respective lock queues.

6. The method of claim 1, wherein the identified transaction is the first transaction, and wherein the method further comprises sending an acknowledgment that the first transaction is durable.

7. The method of claim 1, wherein the identified transaction is not the first transaction, and wherein the method further comprises sending a failure response for the first transaction.

8. A system, comprising:
    a plurality of data nodes; and
    a transaction manager, configured to:
        send to the plurality of data nodes respective lock requests that identify for each respective data node one or more keys to lock at the respective data node and respective sibling keys to lock at data nodes other than the respective data node to perform a first transaction;
        receive, responsive to the respective lock requests, respective lock queues from the data nodes sent the respective lock requests, wherein at least one of the respective lock queues includes a lock request for another transaction in addition to the first transaction;
        evaluate the respective lock queues from the data nodes to identify a transaction to commit based, at least in part, on an ordering of the one or more lock requests within the respective lock queues; and send a request to commit the identified transaction to the data nodes identified according to sibling keys included in a lock request for the identified transaction.

9. The system of claim 8, wherein the send of the respective lock requests, the receipt of the respective lock queues, the evaluation of the respective lock queues, and the send of the request to commit are performed as part of a current round of transaction processing, wherein the send of the respective lock requests, the receipt of the respective lock queues, and the evaluation of the respective lock queues are performed for one or more prior rounds of transaction processing, wherein a transaction is not identified to be committed as part of the one or more prior rounds of transaction processing.

10. The system of claim 9, wherein prior to the send of the respective lock requests, the receipt of the respective lock queues, the evaluation of the respective lock queues, and the send of the request to commit as part of a current round of transaction processing, identify one or more additional keys at one or more other data nodes based, at least in part, on respective lock queues received as part of a prior round of transaction processing, wherein the one or more other data nodes are included with the plurality of data nodes sent the respective lock requests as part of the current round of transaction processing.

11. The system of claim 10, wherein the transaction manager is one of a plurality of transaction managers, wherein the plurality of data nodes are part of a larger collection of data nodes, and wherein the plurality of transaction managers and the larger collection of data nodes are implemented as part of a network-based transaction service.

12. The system of claim 8, wherein the evaluation of the respective lock queues to identify the transaction to commit comprises identifying a particular transaction whose respective lock requests were first to arrive at the respective lock queues.

13. The system of claim 8, wherein the identified transaction is the first transaction, and wherein the transaction manager is further configured to send an acknowledgment that the first transaction is durable.

14. The system of claim 8, wherein the identified transaction is not the first transaction, and wherein the transaction manager is further configured to send a failure response for the first transaction.

15. A non-transitory, computer-readable storage medium, storing program instructions that when executed by one or more computing devices cause the one or more computing devices to implement:
sending to a plurality of data nodes respective lock requests that identify for each respective data node one or more keys to lock at the respective data node and respective sibling keys to lock at data nodes other than the respective data node to perform a first transaction;
receiving, responsive to the respective lock requests, respective lock queues from the data nodes sent the respective lock requests, wherein at least one of the respective lock queues includes a lock request for another transaction in addition to the first transaction;
evaluating the respective lock queues from the data nodes to identify a transaction to commit based, at least in part, on an ordering of the one or more lock requests within the respective lock queues; and
sending a request to commit the identified transaction to the data nodes identified according to sibling keys included in a lock request for the identified transaction.

16. The non-transitory, computer-readable storage medium of claim 15, wherein sending the respective lock requests, receiving the respective lock queues, evaluating the respective lock queues, and sending the request to commit are performed as part of a current round of transaction processing, wherein sending the respective lock requests, receiving the respective lock queues, and evaluating the respective lock queues are performed for one or more prior rounds of transaction processing, wherein a transaction is not identified to commit as part of the one or more prior rounds of transaction processing.

17. The non-transitory, computer-readable storage medium of claim 15, wherein, in evaluating the respective lock queues to identify the transaction to commit, the program instructions cause the one or more computing devices to implement selecting a transaction with a lowest round identifier and transaction identifier that includes at least one successive lock request in the current round of transaction processing as the particular transaction.

18. The non-transitory, computer-readable storage medium of claim 15, wherein prior to sending the respective lock requests, receiving the respective lock queues, evaluating the respective lock queues, and sending the request to commit as part of a current round of transaction processing, identifying one or more additional keys at one or more other data nodes based, at least in part, on respective lock queues received as part of a prior round of transaction processing, wherein the one or more other data nodes are included with the plurality of data nodes sent the respective lock requests as part of the current round of transaction processing.

19. The non-transitory, computer-readable storage medium of claim 15, wherein, in evaluating the respective lock queues from the data nodes to identify the transaction to commit, the program instructions cause the one or more computing devices to implement identifying a particular transaction whose respective lock requests were first to arrive at the respective lock queues for the data nodes.

20. The non-transitory, computer-readable storage medium of claim 15, wherein the plurality of data nodes comprise a plurality of different types of data stores.

* * * * *